United States Patent [19]

Krauss

[11] 4,356,980

[45] Nov. 2, 1982

[54] ELECTROMAGNETICALLY ACTUATABLE VALVE

[75] Inventor: Rudolf Krauss, Stuttgart, Fed. Rep. of Germany

[73] Assignee: Robert Bosch GmbH, Stuttgart, Fed. Rep. of Germany

[21] Appl. No.: 186,064

[22] Filed: Sep. 11, 1980

[30] Foreign Application Priority Data

Sep. 12, 1979 [DE] Fed. Rep. of Germany ....... 2936853

[51] Int. Cl.³ ...................... F16K 31/06; F02M 37/00
[52] U.S. Cl. .................................. 239/585; 251/139; 251/141; 267/161
[58] Field of Search ...................... 239/124, 125, 132.3, 239/132.5, 397.5, 533.2, 533.12, 585; 251/129, 139, 141; 267/161

[56] References Cited

U.S. PATENT DOCUMENTS 2,399,886 5/1946 Odevseff ........................ 267/161 X
2,881,980 4/1959 Beck et al. ...................... 239/585 X
3,001,757 9/1961 Ball .................................... 239/585

FOREIGN PATENT DOCUMENTS 1226650 3/1971 United Kingdom ................ 267/161

*Primary Examiner*—Andres Kashnikow
*Attorney, Agent, or Firm*—Edwin E. Greigg

[57] ABSTRACT

The invention relates to an electromagnetically actuatable valve, which serves in particular to inject fuel into the suction tube of mixture-compressing internal combustion engines having externally supplied ignition. The valve includes a flat armature which is firmly connected with a movable valve element, embodied as a ball which cooperates with a fixed valve seat. The flat armature is provided on its side remote from the valve seat with recesses into which spring tongues formed from a remnant air disc protrude, resting under the influence of voltage on the flat armature and guiding it in parallel fashion.

8 Claims, 6 Drawing Figures

ELECTROMAGNETICALLY ACTUATABLE VALVE

BACKGROUND OF THE INVENTION

The invention relates to an electromagnetically actuatable valve for fuel injection systems. A valve is already known in which the flat armature is guided by a diaphragm held attached to the housing on its circumference. When the flat armature is suspended via a diaphragm in this manner, however, there is the danger that the flat armature may execute uncontrolled fluttering movements before, during and after actuation. Furthermore, this kind of embodiment entails additional expense.

OBJECT AND SUMMARY OF THE INVENTION

The electromagnetically actuatable valve according to the invention set forth herein has the advantage over the prior art in that the flat armature is unequivocally guided during the attracting or releasing movement. As a result, there is an improvement in the characteristic curve of the valve. The structure is furthermore simpler and thus more favorable in cost.

As a result of the characteristics disclosed herein, advantageous variants of and improvements to the valve disclosed can be attained.

The invention will be better understood and further objects and advantages thereof will become more apparent from the ensuing detailed description of three preferred embodiments taken in conjunction with the drawings.

DESCRIPTION OF THE PREFERRED EMBODIMENTS

Figure 1:
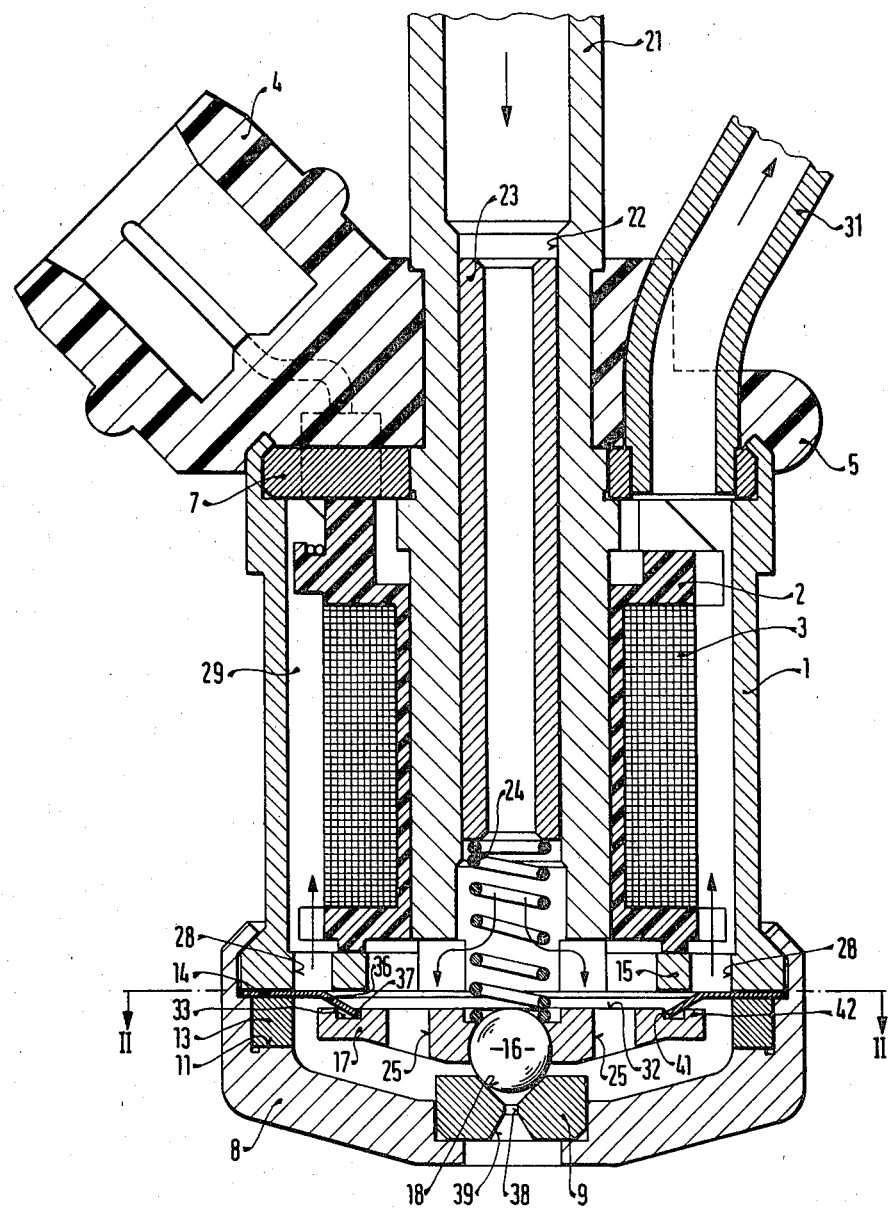
FIG. 1 shows in cross-section a first exemplary embodiment of a fuel injection valve.

The fuel injection valve shown in FIG. 1 and intended for a fuel injection system serves to inject fuel, in particular at low pressure, into the suction tube of mixture-compressing internal combustion engines having externally supplied ignition. A magnetic coil 3 is disposed on a coil carrier 2 in a valve housing 1. The magnetic coil 3 is supplied with electric current via an electric plug connection 4, which is embedded in a plastic ring 5 placed axially over the valve housing 1. A sealing plate 7 is inserted into the end of the valve housing 1 oriented toward the electric plug connection 4, sealing the valve housing at this end by virtue of being flanged and welded or soldered. On the end of the fuel injection valve remote from the electric plug connection 4, a nozzle carrier 8 is flanged in a sealing manner to the valve housing 1, and a nozzle body 9 is disposed in this nozzle carrier 8.

Figure 2:
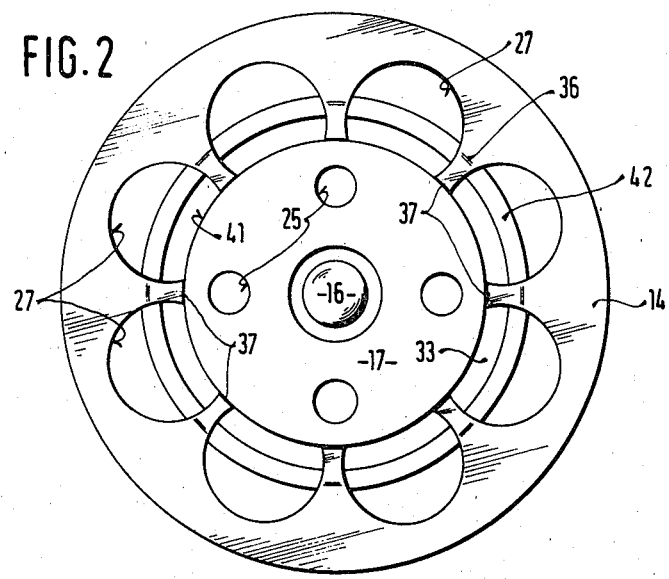
FIG. 2 is a section taken along the line II—II of FIG. 1.
Figure 3:
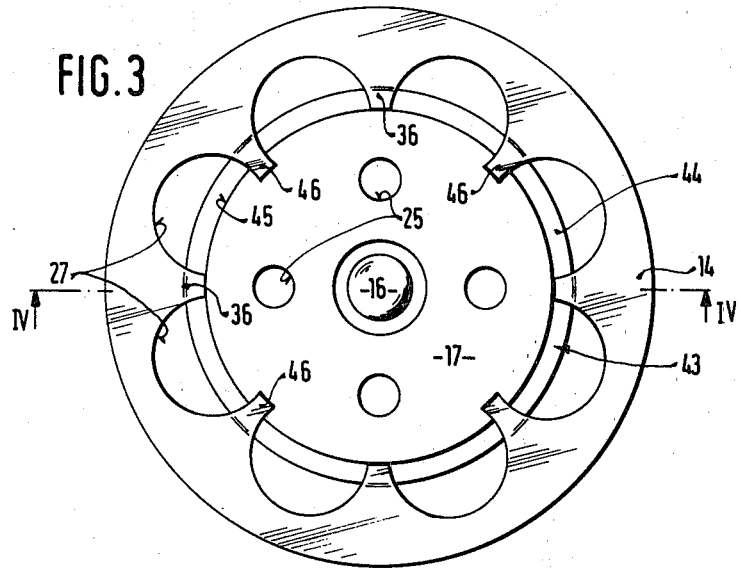
FIG. 3 is a partial view of a fuel injection valve having a remnant air disc and a flat armature.
Figure 4:
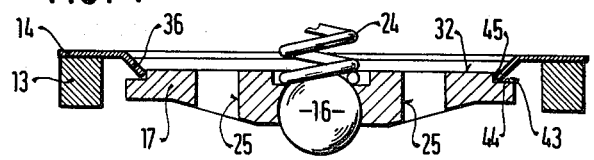
FIG. 4 is a section taken along the line IV—IV of FIG. 3.

A stroke ring 13 rests on a step 11 in the interior of the nozzle carrier 8, and a remnant air disc 14 rests on the stroke ring 13, being held in place on the valve housing 1 by the pressure force resulting from the flanging of the nozzle carrier 8. The remnant air disc 14, made of nonmagnetic material, extends radially, at least in part, over a base 15 of the valve housing 1 remote from the electric plug connection 4 and prevents magnetic adherence of the flat armature 17 to the base 15. A ball 16 acts as the movable valve element, being firmly connected to the flat armature 17 and cooperating with a conically extending fixed valve seat 18 in the nozzle body 9. The supply of fuel, for instance gasoline, is effected via a central fuel inflow nozzle 21, which simultaneously acts as the magnetic core and upon which the coil carrier 2 is disposed. A tube insert 23 is inserted into the inlet bore 22 of the fuel inflow nozzle 21. A closing spring 24 is supported on one end on the tube insert 23 and on the other end rests on the flat armature 17. In the nonexcited state of the magnetic element 3, 17, the closing spring 24 presses the ball 16 against the valve seat 18 of the nozzle body 9, closing it. The fuel flowing via the fuel inlet nozzle 21 into the fuel injection valve proceeds through apertures 25 in the flat armature 17 to the actual valve, comprising the valve seat 9, 18 and the ball 16. From there the fuel can flow past the outer rim of the flat armature 17 via recesses 27 (shown in FIG. 2) in the remnant air disc 14 and via openings 28 in the base 15 of the valve housing 1 into a coil chamber 29 formed between the magnetic coil 3 and the valve housing 1. The coil chamber 29 communicates via a fuel discharge nozzle 31 with a fuel return line, not shown.

The circularly embodied flat armature 17 has an annular groove 33 disposed at a distance from the circumference on the side 32 remote from the valve seat 18. The spring tongues 36 protrude into the annular groove 33, preferably being cut out of the remnant air disc 14 and shaped such that they contact the flat armature 17 under the influence of voltage and urge the flat armature 17 in the closing direction of the valve. The ends 37 of the spring tongues 36 engage the inner side wall 41 of the annular groove 33 and center the flat armature 17. In order to prevent tilting of the flat armature 17, at least four spring tongues 36, disposed 90° apart from one another, should be provided. The spring tongues 36 can be formed by stamping circular recesses 27 out of the remnant air disc 14, which in turn is embodied as an annular disc, with the spring tongues 36 coming to rest between the recesses 27. By guiding the flat armature 17 on the spring tongues 36 of the remnant air disc 14, it is assured that the flat armature is guided precisely and that fluttering movements of the flat armature 17, such as occur in the case of diaphragm guidance, will not occur. In addition, the guide diaphragm can be omitted.

In the excited state, the flat armature 17 is attracted by the magnetic coil 3 until its outer annular face 42 presses the spring tongues 36 against the base 15, and the ball 16 opens a flowthrough cross section opposite the valve seat 18. Fuel can reach a nozzle bore 38, which throttles and meters the fuel and which is provided in the nozzle body 9, by way of the valve seat 18, and the fuel can then be ejected via an adjoining ejection port 39 which widens in conical fashion.

The embodiment of the fuel injection valve likewise makes it possible for fuel, arriving via the fuel inlet nozzle 21 from a fuel supply line which is not shown, to be carried continuously past the valve seat 18 and, flowing around the magnetic coil 3, to flow back via the fuel discharge nozzle 31 into a fuel return line. Thus, on the one hand, vapor bubbles which may form as a result of heating are carried along to the fuel return line and, on the other hand, continuous cooling of the fuel injection valve by the flowing fuel is assured.

The precise centering of the flat armature 17 and thus of the ball 16 acting as the movable valve element is not only important for the tightness of the valve seal but also for uniform shaping of the fuel stream during the injection process. If the ball 16 were to strike the valve seat 18 eccentrically, a non-uniform fuel stream would result, preventing precise termination of the stream.

In the exemplary embodiments of a fuel injection valve shown in partial view in FIGS. 3–6, elements remaining identical to and having the same function as those of FIG. 1 are indicated by identical reference numerals. In the exemplary embodiment shown in FIGS. 3 and 4, the flat armature 17 has an annular recess 43 on its side 32 remote from the valve seat 18, this annular recess 43 being open toward the circumference. The spring tongues 36 protrude into it in such a fashion that they rest on the bottom face 44 and on the end face 45 of the annular recess 43, thus centering the flat armature 17. In addition to the spring tongues 36, tongues 46 are formed out of the remnant air disc 14, which are longer than the spring tongues 36 and protrude at least partially beyond the side 32 of the flat armature 17 remote from the valve seat 18, in order to prevent magnetic adherence of the flat armature 17 on the base 15. Here again it is efficient for there to be four tongues 46 at angles of 90° from one another, normally resting flat on the base 15.

Figure 5:
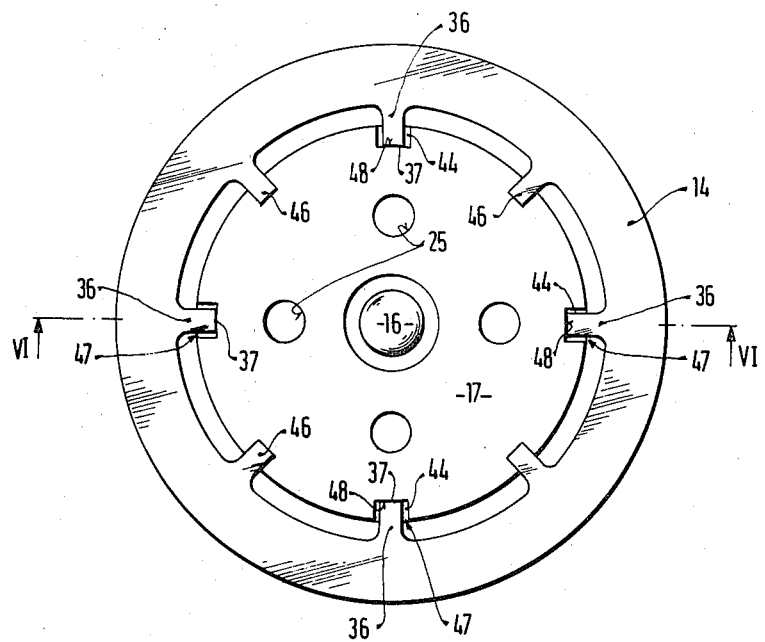
FIG. 5 is a partial view of a fuel injection valve having a remnant air disc and a flat armature.
Figure 6:
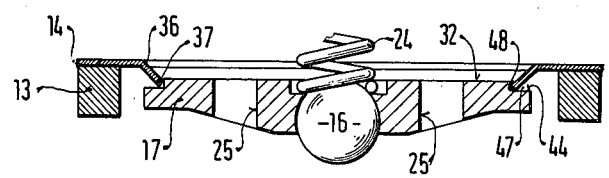
FIG. 6 is a section taken along the line VI—VI of FIG. 5.

In the third exemplary embodiment shown in FIGS. 5 and 6, the flat armature 17 does not have an annular recess on its side 32 remote from the valve seat 18; instead, it has individual recesses 47 open toward the circumference. The spring tongues 36 protrude into these recesses 47 in such a manner that their ends 37, on the end face 48 of the recesses 47 pointing toward the center of the flat armature 17, engage the flat armature 17 so as to center it. Again, tongues 46 serve to prevent magnetic adherence of the flat armature 17 to the base 15.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An electromagnetically actuatable fuel injection valve for fuel injection systems of internal combustion engines having a housing, a magnetic element in said housing, a flat armature positioned relative to said magnetic element for operation by said magnetic element, a movable valve element secured to said flat armature and arranged to cooperate with a fixed valve seat in said housing, characterized in that a remnant air disc of non-magnetic material is disposed within said housing between said flat armature and said magnetic element, said remnant air disc further including at least four spring tongues arranged to guide said flat armature and urge (it) said valve element in a closing direction of said valve seat.

2. A valve as defined by claim 1, characterized in that said flat armature is provided with a grooved portion on an end face into which said spring tongues project, said spring tongues arranged to center said flat armature and said movable valve element relative to said valve seat.

3. A valve as defined by claim 2, characterized in that said flat armature is circular and said grooved portion is annular.

4. A valve as defined by claim 1, characterized in that said flat armature has a side remote from the valve seat, which is provided with a recess open toward the circumference of said flat armature, said spring tongues arranged to protrude into said recess and center said flat armature.

5. A valve as defined by claim 4, characterized in that said remnant air disc further includes other tongue elements which have a length greater than said spring tongues.

6. A valve as defined by claim 5, characterized in that said flat armature is circular and further includes an annular recess.

7. A valve as defined by claim 1, characterized in that said flat armature has an area open toward the circumference thereof, said area having an upstanding wall arranged to merge with a bottom wall and said spring tongues cooperate with said respective walls to center said flat armature.

8. A valve as defined by claim 7, characterized in that said remnant air disc further includes other tongue elements which have a length greater than said spring tongues and said other tongue elements rest on a shelf area which lies in a plane above said recess.

* * * * *